(12) United States Patent
Poutanen

(10) Patent No.: US 10,972,918 B2
(45) Date of Patent: Apr. 6, 2021

(54) METHOD AND APPARATUS FOR MOBILE NETWORK DESIGNING

(71) Applicant: Elisa Oyj, Helsinki (FI)

(72) Inventor: Juho Poutanen, Kauniainen (FI)

(73) Assignee: Elisa Oyj, Helsinki (FI)

( * ) Notice: Subject to any disclaimer, the term of this patent is extended or adjusted under 35 U.S.C. 154(b) by 29 days.

(21) Appl. No.: 16/349,751

(22) PCT Filed: Nov. 9, 2017

(86) PCT No.: PCT/FI2017/050772
§ 371 (c)(1),
(2) Date: May 14, 2019

(87) PCT Pub. No.: WO2018/091772
PCT Pub. Date: May 24, 2018

(65) Prior Publication Data
US 2019/0335339 A1    Oct. 31, 2019

(30) Foreign Application Priority Data

Nov. 15, 2016  (FI) ...................................... 20165857

(51) Int. Cl.
*H04W 16/18* (2009.01)
*H04W 36/00* (2009.01)
(Continued)

(52) U.S. Cl.
CPC .............. *H04W 16/18* (2013.01); *G01S 5/30* (2013.01); *H04W 24/02* (2013.01); *H04W 36/00835* (2018.08); *H04W 64/003* (2013.01)

(58) Field of Classification Search
CPC ........... H04W 16/18; H04W 36/00835; H04W 24/02; H04W 64/003; H04W 36/08;
(Continued)

(56) References Cited

U.S. PATENT DOCUMENTS

| | | | |
|---|---|---|---|
| 7,171,241 B2* | 1/2007 | Ylitalo | ..................... H01Q 3/26 455/424 |
| 8,406,785 B2* | 3/2013 | Alizadeh-Shabdiz | .... G01S 5/02 455/456.1 |

(Continued)

FOREIGN PATENT DOCUMENTS

| | | |
|---|---|---|
| CN | 101800995 A | 8/2010 |
| CN | 101959227 A | 1/2011 |

(Continued)

OTHER PUBLICATIONS

Finnish Patent Office, Search Report, Application No. 20165857, dated May 16, 2017, 1 page.

(Continued)

*Primary Examiner* — Hanh N Nguyen
(74) *Attorney, Agent, or Firm* — Ziegler IP Law Group, LLC

(57) ABSTRACT

A method for a mobile network, which mobile network is formed of cells. The method includes determining a weight factor between two cells of the mobile network, which determination of the weight factor includes calculating a distance factor between the cells, calculating an angle factor between the cells, and calculating the weight factor between the cells with an exponential function of the distance factor and the angle factor. The weight factors between the cells may be used for determining network parameters of a mobile network.

13 Claims, 3 Drawing Sheets

(51) Int. Cl.
*G01S 5/30* (2006.01)
*H04W 24/02* (2009.01)
*H04W 64/00* (2009.01)

(58) Field of Classification Search
CPC ............ H04W 36/32; H04W 36/0072; H04W 36/00837; H04W 36/0077; G06F 19/00; G05D 1/02
See application file for complete search history.

(56) References Cited

U.S. PATENT DOCUMENTS

| | | | |
|---|---|---|---|
| 9,216,508 B2* | 12/2015 | Ruuspakka | B25J 9/1664 |
| 9,854,451 B2* | 12/2017 | Imran | H04W 16/26 |
| 2014/0057638 A1 | 2/2014 | Carey et al. | |
| 2015/0146547 A1* | 5/2015 | Kapnadak | H04W 36/30 |
| | | | 370/252 |

FOREIGN PATENT DOCUMENTS

| | | | |
|---|---|---|---|
| CN | 102036253 A | 4/2011 | |
| CN | 105228161 A | 1/2016 | |
| CN | 105491574 A | 4/2016 | |
| WO | 2015109314 A1 | 7/2015 | |

OTHER PUBLICATIONS

International Search Report and Written Opinion of the International Searching Authority, Application PCT/FI2017/050772, dated Feb. 15, 2018, 60 pages.

* cited by examiner

METHOD AND APPARATUS FOR MOBILE NETWORK DESIGNING

FIELD

The aspects of the disclosed embodiments relate in general to mobile network designing and/or optimization and/or to determination of network parameters of a mobile network.

BACKGROUND

The term mobile network is used to refer in general to communication networks that enable data transfer (for example data, calls) over a radio interface. Mobile networks and wireless networks are formed of cells, each server by a base station. Network may comprise a plurality of different cells. Cell size and form depend for example on base station transmitters frequency range, power, directional patterns of base station antennas and landscape. Characteristics of each cell may be controlled by adjusting different network parameters. Instead of individual cells, network designing usually requires taking into account overall effects of the cells, because changes made in one cell have an effect on operation of the network also in other cells.

Now there is provided a solution that can be utilized in mobile network designing/optimization/determination of network parameters.

SUMMARY

A first aspect of the disclosed embodiments provide a method for a mobile network, which mobile network is formed of cells. The method comprises determining a weight factor between two cells of the mobile network, wherein the determination of the weight factor comprises calculating a distance factor between the cells, calculating an angle factor between the cells, and calculating the weight factor between the cells with an exponential function of the distance factor and the angle factor.

In an embodiment the distance factor indicates how far from each other the cells are.

In an embodiment the distance factor is the distance between base stations of said cells.

In an embodiment the angle factor indicates how perpendicularly antennas of base stations of the cells are directed towards each other.

In an embodiment the angle factor is distance between intersections, which intersections are reached by travelling half of the distance between the cells in antenna directions of the cells.

In an embodiment the exponential function comprises a first coefficient, which is used to weigh distance between the cells, and a second coefficient, which is used to weigh the effect of antenna directions of the cells.

In an embodiment the exponential function is product of two exponential functions.

In an embodiment there is provided a method for configuration actions of a mobile network, which mobile network is formed of cells, and which configuration actions comprise determination of at least one network parameter for the cells of the mobile network. The method comprises processing cells of said mobile network in cell pairs, determining weight factors for the cell pairs with one of the manners presented in the foregoing, and using said determined weight factors of the cell pairs for determining at least one network parameter of the mobile network.

A second aspect of the disclosed embodiments provide an apparatus, that comprises a processor and a computer program stored in a memory, the computer program being configured together with said at least one processor to control the apparatus to perform the method according to the first aspect or any embodiment related to it.

A third aspect of the disclosed embodiments provide a computer program that comprises computer executable program code, which when executed controls the computer to perform the method according to the first aspect or any embodiment related to it.

The computer program according to the third aspect may comprise program code that may be executed for example by any one of the following: general purpose processor, microprocessor, application specific integrated circuit and digital signal processor. The computer program according to the third aspect may be stored in a computer readable media. Such media may be for example a disk, CDROM, DVD, BD (Bluray Disc), memory card or other magnetic or optic memory device.

BRIEF DESCRIPTION OF THE DRAWINGS

The aspects of the disclosed embodiments are now described by way of example with reference to the enclosed drawings, wherein.

DETAILED DESCRIPTION

In an embodiment of the present disclosure cells of a mobile network are handled in cell pairs. A weight factor is calculated for each cell pair and these weight factors between the cell pairs are used in designing/optimization of the network. Calculation of the weight factors uses location coordinates and antenna directions of the cells (of base stations). According to an example definition the weight factor describes how radio signal behaves as a function of distance in the area of said cell pair. Weight factor can be referred to with English term 'cost'.

The cell pairs may be ordered according to priority or performance with the weight factors calculated for them. Weight factors calculated for the cell pairs and/or the priority order obtained with the weight factors may be used in different tasks related to designing, optimization or configuration of mobile networks or cellular networks, such as for example in optimization of neighbourhoods between the cells, physical cell id of LTE (Long Term Evolution) network, scrambling code of 3G (Third Generation) network, PRACH (Physical Random Access Channel) root sequence of LTE network and channels of 2G (Second Generation) network.

Figure 1:
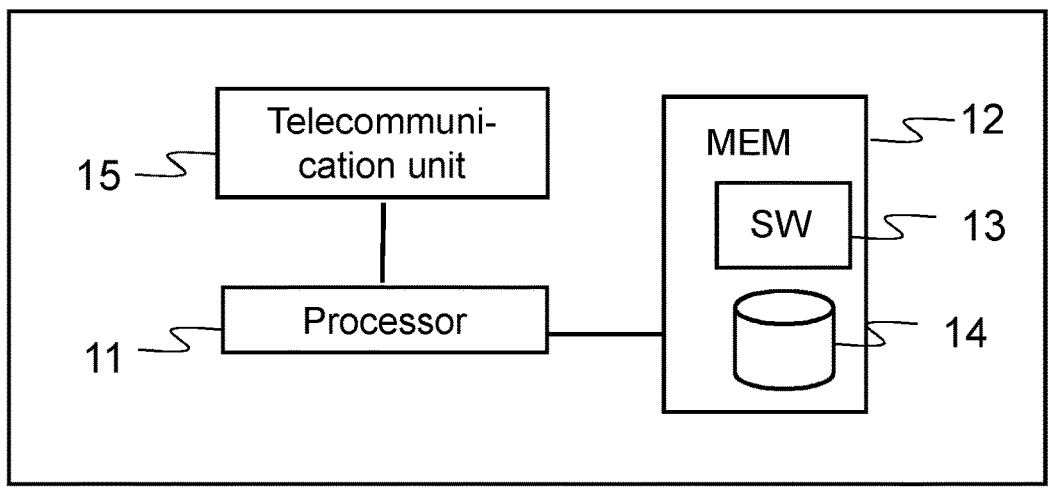
FIG. 1 shows an example of an apparatus that is suited for implementing embodiments of the present disclosure.

FIG. 1 shows an example of an apparatus 10 that is suited for implementing embodiments of the invention. The apparatus may be for example a general-purpose computer or server and it may be adapted to execute for example the method hereinafter illustrated in FIG. 2.

The apparatus 10 comprises a processor 11 for controlling the operation of the apparatus and a memory 12, which comprises a computer program 13 and a database 14. The computer program 13 may comprise instructions for the processor for controlling the apparatus 10, such as for example operating system and different applications. Additionally, the computer program 13 may comprise an application that comprises instructions for controlling the apparatus 10 so that functionality according to some embodiment of the invention is produced.

The processor 11 may be for example a central processing unit (CPU), a microprocessor, a digital signal processor (DSP), graphic processor, or the like. The Fig. shows only one processor, but the apparatus may comprise a plurality of processors.

The memory 12 may be for example read-only memory (ROM), a programmable read-only memory (PROM), EPROM memory (erasable programmable read-only memory), EEPROM memory (electronically erasable programmable read-only memory), RAM memory (random-access memory), flash memory, optic or magnetic memory or the like. The apparatus may comprise a plurality of memories. The memory may be part of the apparatus 10 or it may be separate module attachable to the apparatus 10. The memory may be intended only for storing data or it may be used also in processing of the data.

Additionally the apparatus 10 comprises a telecommunication unit 15. The telecommunication unit provides an interface for communicating with other apparatuses. The interface may be for example fixed, wired connection, such as Ethernet connection or an ADSL/VDSL connection, or a wireless connection, such as WLAN, Bluetooth, GSM/GPRS, CDMA, WCDMA or LTE connection. A communication interface module may be integrated into the apparatus 10 or it may be part of an adapter, card or the like that may be attached to the apparatus 10. The telecommunication unit may support one or more communication technologies or the apparatus may have many telecommunication units.

For receiving input from the user and for providing output to the user the apparatus 10 may comprise also a user interface unit (not shown in Fig.), which may comprise for example a display and a keyboard (not shows in Fig.) that may be intergrated part of the apparatus 10 or independent parts connectable to the apparatus 10. The user interface is not mandatorily needed though, or the user interface may be implemented as a remote connection through the telecommunication unit 15.

In addition to the elements shown in FIG. 1 the apparatus 20 may comprise also other elements.

Figure 2:
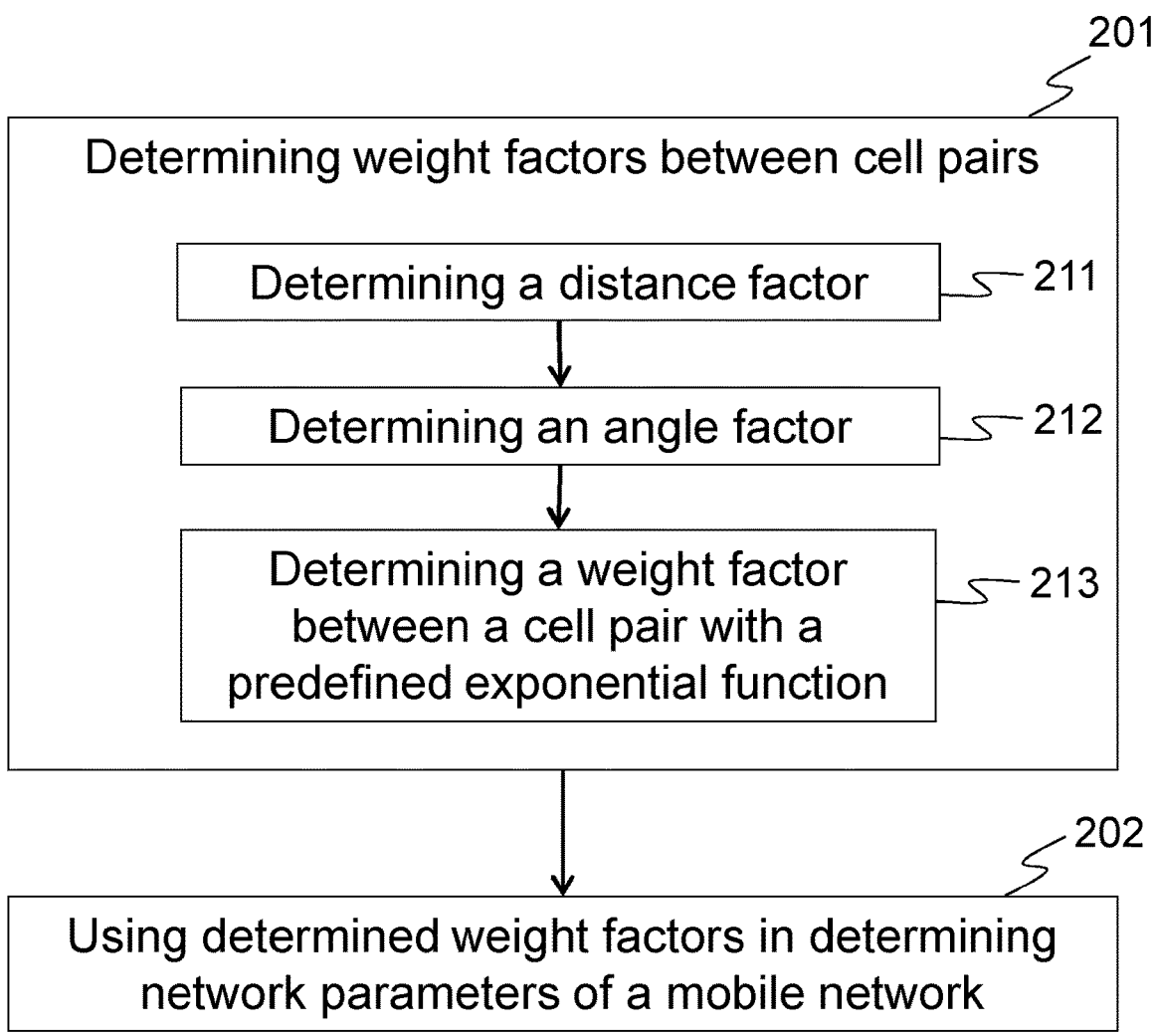
FIG. 2 shows a flow chart illustrating a method according to an embodiment of the present disclosure.

FIG. 2 shows a flow chart illustrating a method according to an embodiment of the present disclosure. The method may be performed for example in the apparatus of FIG. 1 or in other comparable device.

Phases of FIG. 2 are explained in the following:

201: Cells of said mobile network are processed in cell pairs, and weight factors between the cell pairs are determined. The weight factors may be calculated for all possible cell pair combinations of the network or only for some of the cell pairs. It may be determined for example that each cell may be a pair only with cells within certain distance and/or that only certain number of weight factors may be calculated for each cell with the closest cells. Alternatively or additionally, the weight factors may be determined for all cell pairs within certain geographic area. Alternatively or additionally, the calculation of weight factors for a certain cell may be terminated for example when certain number of cells that fulfil certain criteria (the weight factor of the cells exceeds or is below certain threshold values) have been found. The determination of the weight factors comprises the phases 211-213.

211: A distance factor is determined for the cells of the cell pair. The distance factor indicates how far from each other the cells are. For this purpose coordinates (latitude, longitude) of the cells (base stations) in decimal degrees are fetched from a database and the distance between the base stations is calculated on the basis of these. Determination of the distance factor has been handled in more detail in connection with FIG. 3.

212: An angle factor is determined for the cells of the cell pair. According to a definition the angle factor indicates how perpendicularly antennas of base stations of the cells are directed towards each other. In an embodiment, the angle factor is distance between those intersections, which intersections are reached by travelling half of the distance between the cells in the direction pointed by the antenna directions of the cells. For this purpose antenna directions of the base stations of the cells in degrees are fetched from a database. Determination of the angle factor has been handled in more detail in connection with FIG. 3.

213: The weight factor is determined for the cells of the cell pair with the distance factor, the angle factor and a predefined exponential function. In an embodiment, the exponential function that is used is product of two exponential functions. The function that is used for the determination of the weight factors is handled in more detail hereinafter in this document.

202: The determined weight factors are used in determination of the network parameters of a mobile network to optimize or configure the operation of the network. The cell pairs may be ordered according to priority or performance on the basis of the weight factors. For example n most suitable pairs may be searched for each cell. Here n may be for example 3, 5, or 10 or some other number. The weight factors may be used for example in the following optimization tasks:

optimization of neighbourhoods
Physical cell id optimization
Scrambling code optimization
PRACH root sequence optimization.

Figure 3:
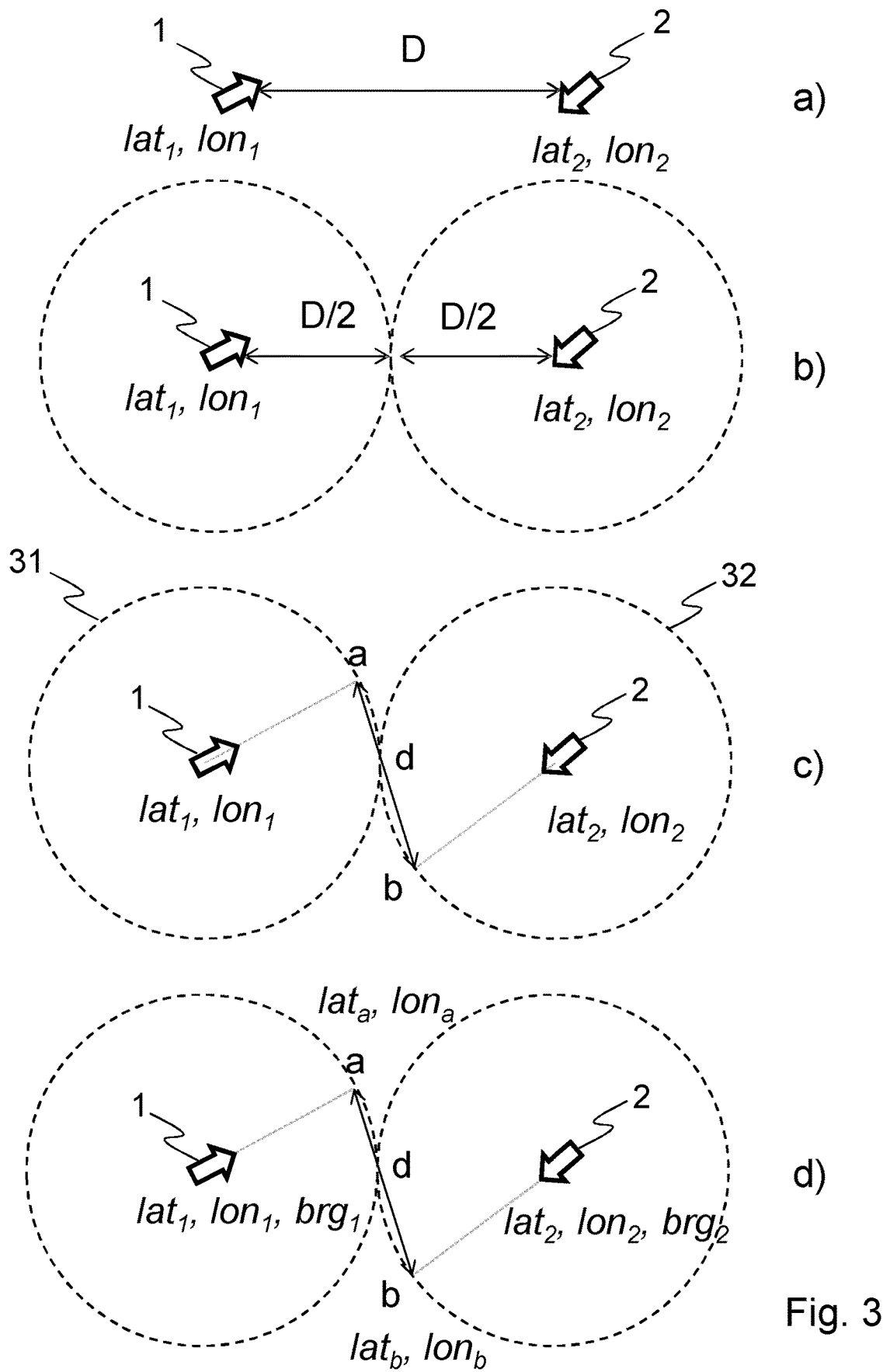
FIG. 3 illustrates determination of a distance factor and an angle factor according to an embodiment of the present disclosure.

FIG. 3 illustrates determination of a distance factor and an angle factor according to an embodiment of the invention. Fig. shows two cells 1 and 2. Block arrows 1 and 2 illustrate antenna directions of the cells.

Phase a)

Distance factor is distance D between cells (base stations) 1 and 2.

This distance D is calculated with formula:

$$D=\cos^{-1}(\sin(lat_1)*\sin(lat_2)+\cos(lat_1)*\cos(lat_2)*\cos(lon_1-lon_2))*R,$$

wherein $lat_1$, $lon_1$ and $lat_2$, $lon_2$ are coordinates of the cells 1 and 2 and R is radius of the earth.

Phase b)

There are imaginary circles 31 and 32, whose radius is D/2, around the base stations of the cells 1 and 2, wherein D is the distance between the cells 1 and 2 calculated in the foregoing.

Phase c)

Lines are drawn in the directions of the antennas of the cells till the circumference of the circles 31 and 32. The distance between the intersections a and b between these lines and the circles 31 and 32 is the angle factor d.

d receives values between 0 (cells are completely in same direction) and 2*D (cells are completely in opposite directions). If one normalizes d/(2*D), the angle factor receives values between 0 . . . 1.

Phase d)

For the determination of the angle factor d one calculates coordinates of the points a and b $lat_a$, $lon_a$ ja $lat_b$, $lon_b$ with formulas:

$$lat_a = \sin^{-1}\left(\sin(lat_1) * \cos\left(\frac{D/2}{R}\right) + \cos(lat_1) * \sin\left(\frac{D/2}{R}\right) * \cos(brg_1)\right)$$

$$lon_a = lon_1 + \mathrm{atan2}\left(\sin(brg_1) * \sin\left(\frac{D/2}{R}\right) * \cos(lat_1),\right.$$
$$\left.\cos\left(\frac{D/2}{R}\right) - \sin(lat_1) * \sin(lat_a)\right)$$

$$lat_b = \sin^{-1}\left(\sin(lat_2) * \cos\left(\frac{D/2}{R}\right) + \cos(lat_2) * \sin\left(\frac{D/2}{R}\right) * \cos(brg_2)\right)$$

$$lon_b = lon_2 + \mathrm{atan2}\left(\sin(brg_2) * \sin\left(\frac{D/2}{R}\right) * \cos(lat_2),\right.$$
$$\left.\cos\left(\frac{D/2}{R}\right) - \sin(lat_2) * \sin(lat_b)\right)$$

wherein $lat_1$, $lon_1$ and $lat_2$, $lon_2$ are coordinates of the points a and b, $brg_1$ and $brg_2$ are antenna directions of the cells 1 and 2, R is radius of the earth, and D is the distance between the cells (base stations) 1 and 2.

After this the distance d between the points a and b, i.e. the angle factor, is obtained with the formula:

$$d = \cos^{-1}(\sin(lat_a) * \sin(lat_b) + \cos(lat_a) * \cos(lat_b) * \cos(lon_a - lon_b)) * \frac{R * 360}{2D}$$

According to an embodiment the distance factor D and the angle factor d between the cells of the cell pairs are used for calculating weight factor 'cost' with formula $$\mathrm{cost} = e^{-\alpha*D} * e^{-\beta*d*D}$$

wherein D is the distance between the cells (distance factor), d is the angle factor calculated using the formulas presented in the foregoing, and α and β are coefficients set for the model.

α and β may be chosen according to how much one wants to put weight on the distance (α) and how much on the antenna directions (β).

Weight factor 'cost' thus receives values between 0 . . . 1, wherein higher value indicates higher weight factor.

Figure 4:
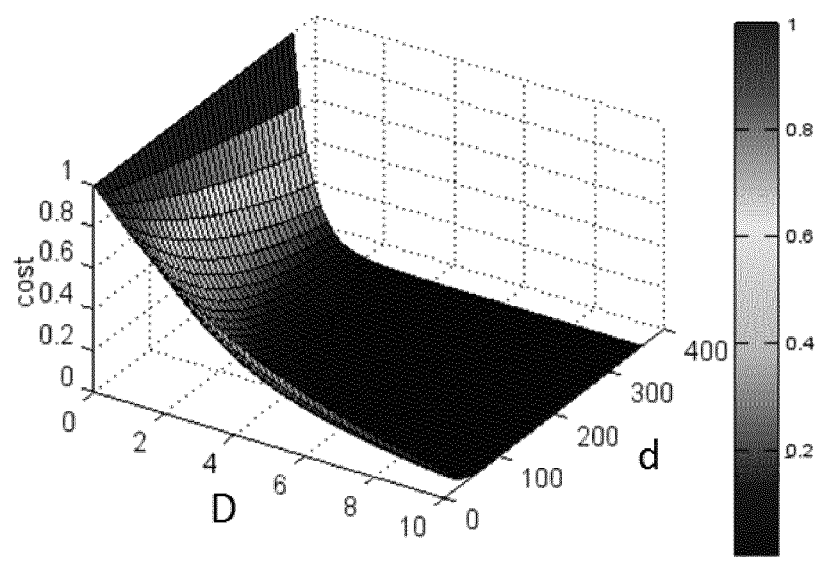
FIG. 4 shows a plot of weight factor according to an example as a function of the distance factor and the angle factor.

FIG. 4 shows a plot of weight factor 'cost' according to an example as a function of the distance factor D and the angle factor d. In the example of FIG. 4 one has used the example of the exponential function presented in the foregoing and the constants of the function have been chosen α=−0.2 and β=−0.005.

Herein it is to be noted that this is only one example of possible exponential function and the constants of it. α and β are set according to how much one wants to put weight on the distance (α) and how much to the antenna directions (β). For example in rural environment one may want to put more weight to the distance, since cells typically cover larger geographical area than in cities. Whereas in cities the buildings affect propagation of radio signals and cell size is typically smaller than in rural areas, whereby in city environment one may want to put more weight to antenna directions.

The 'cost' formula according to an embodiment presented in the foregoing may be generalized into form:

$$\mathrm{cost} = x^{-\alpha*D} * y^{-\beta*d*D}$$

wherein D is the distance between the cells (distance factor), d is the angle factor, and α and β as well as x and y are coefficients set for the model.

The coefficients are defined so that the 'cost' formula depicts, with the desired weighting, how radio signal behaves as a function of distance and antenna directions in the area of the cell pair in question.

A benefit achieved with various embodiments of the present disclosure is that with the weight factors calculated for the cell pairs it may be possible to automatize determination of network parameters. Cell pairs may be automatically ordered on the basis of the weight factors and thereby it is possible to find best or sufficiently good cell pairs for each cell of the network for different purposes, such as cells that are close enough or cells that cause sufficiently low disturbance to said cell.

Foregoing description provides non-limiting examples of some embodiments of the present disclosure. It is clear for a skilled person that the invention is however not limited to presented details but that the invention may be implemented in other equivalent ways. One needs to for example understand that in presented methods one may change the order to individual method phases and that some phases may be repeated plurality of times and some may be left out altogether. One needs to understand also that in this document the terms comprise and include are open-ended terms and they are not meant to be limiting.

Additionally some features of the presented embodiments of the present disclosure may be utilized without the use of other features. Foregoing description needs to be considered as such only as a disclosure depicting principles of the present disclosure and not as limiting the present disclosure. Scope of the present disclosure is limited by the enclosed claims only.

The invention claimed is:

1. A method for a mobile network, which mobile network is formed of cells, wherein the method comprises determining a weight factor between two cells of the mobile network, which determination of the weight factor comprises
    calculating a distance factor between the cells,
    calculating an angle factor between the cells, wherein said angle factor indicates how perpendicularly antennas of base stations of the cells are directed towards each other, and
    determining the weight factor between the cells with an exponential function of the distance factor and the angle factor; and
    using the determined weight factor for designing, optimization, or configuration of the mobile network.

2. The method according to claim 1, wherein said distance factor indicates how far from each other the cells are.

3. The method according to claim 1, wherein said distance factor is distance between base stations of said cells.

4. The method according to claim 1, wherein said angle factor is a distance between intersections of lines drawn in the directions of antennas of the cells with imaginary circles having a radius of.

5. The method according to claim 1, wherein said exponential function comprises a first coefficient, which is used to weigh distance between the cells, and a second coefficient, which is used to weigh the effect of antenna directions of the cells.

6. The method according to claim 1, wherein said exponential function is product of two exponential functions.

7. A method for configuration actions of a mobile network, which mobile network is formed of cells, and which configuration actions comprise determination of at least one network parameter for the cells of the mobile network, wherein the method comprises processing cells of said mobile network in cell pairs,
determining weight factors for the cell pairs by
calculating a distance factor between the cells of the pair,
calculating an angle factor between the cells of the pair, wherein said angle factor indicates how perpendicularly antennas of base stations of the cells are directed towards each other, and
determining the weight factor between the cells of the pair with an exponential function of the distance factor and the angle factor, and
using said determined weight factors of the cell pairs for determining at least one network parameter of the mobile network.

8. The method according to claim 7, wherein said exponential function comprises a first coefficient, which is used to weigh distance between the cells, and a second coefficient, which is used to weigh the effect of antenna directions of the cells.

9. The method according to claim 7, wherein said exponential function is product of two exponential functions.

10. An apparatus comprising a processor and a computer program stored in a memory, the computer program being executed by said at least one processor to control the apparatus to calculate a distance factor between the cells,
calculate an angle factor between the cells, wherein said angle factor indicates how perpendicularly antennas of base stations of the cells are directed towards each other,
determine the weight factor between the cells with an exponential function of the distance factor and the angle factor, and
use the determined weight factor for designing, optimization, or configuration of the mobile network.

11. The apparatus according to claim 10, wherein said distance factor indicates how far from each other the cells are.

12. The method according to claim 10, wherein said exponential function comprises a first coefficient, which is used to weigh distance between the cells, and a second coefficient, which is used to weigh the effect of antenna directions of the cells.

13. A computer program stored on a non-transitory memory medium, the computer program comprising computer executable program code, wherein when executed, the program code controls the computer to calculate a distance factor between the cells,
calculate an angle factor between the cells, wherein said angle factor indicates how perpendicularly antennas of base stations of the cells are directed towards each other,
determine the weight factor between the cells with an exponential function of the distance factor and the angle factor, and
use the determined weight factor for designing, optimization, or configuration of the mobile network.

* * * * *